(12) United States Patent
Boesen et al.

(10) Patent No.: US 10,587,943 B2
(45) Date of Patent: Mar. 10, 2020

(54) EARPIECE WITH WIRELESSLY RECHARGING BATTERY

(71) Applicant: BRAGI GmbH, München (DE)

(72) Inventors: Peter Vincent Boesen, München (DE); Eric Christian Hirsch, München (DE)

(73) Assignee: BRAGI GmbH, München (DE)

( * ) Notice: Subject to any disclaimer, the term of this patent is extended or adjusted under 35 U.S.C. 154(b) by 68 days.

(21) Appl. No.: 15/643,606

(22) Filed: Jul. 7, 2017

(65) Prior Publication Data

US 2018/0014104 A1 Jan. 11, 2018

Related U.S. Application Data

(60) Provisional application No. 62/360,378, filed on Jul. 9, 2016.

(51) Int. Cl.
| | |
|---|---|
| *H04R 1/10* | (2006.01) |
| *E21B 47/12* | (2012.01) |
| *H02J 7/02* | (2016.01) |
| *H02J 50/90* | (2016.01) |
| *H02J 50/10* | (2016.01) |

(52) U.S. Cl.
CPC ............ *H04R 1/1025* (2013.01); *H02J 7/025* (2013.01); *H02J 50/10* (2016.02); *H02J 50/90* (2016.02); *H04R 1/1016* (2013.01); *H04R 1/1041* (2013.01); *H04R 2420/07* (2013.01)

(58) Field of Classification Search
CPC .. H04B 7/2609; H04B 5/0037; H04B 5/0043; H04B 5/0081; H04B 7/24; H02J 50/10; H02J 7/007; H02J 7/04

USPC ............. 381/74; 340/853.1, 854.6, 854.8
See application file for complete search history.

(56) References Cited

U.S. PATENT DOCUMENTS

| | | | |
|---|---|---|---|
| 2,325,590 | A | 8/1943 | Carlisle et al. |
| 2,430,229 | A | 11/1947 | Kelsey |
| 3,047,089 | A | 7/1962 | Zwislocki |
| D208,784 | S | 10/1967 | Sanzone |
| 3,586,794 | A | 6/1971 | Michaelis |

(Continued)

FOREIGN PATENT DOCUMENTS

| | | |
|---|---|---|
| CN | 204244472 U | 4/2015 |
| CN | 104683519 A | 6/2015 |

(Continued)

OTHER PUBLICATIONS

Akkermans, "Acoustic Ear Recognition for Person Identification", Automatic Identification Advanced Technologies, 2005 pp. 219-223.

(Continued)

*Primary Examiner* — George C Monikang
(74) *Attorney, Agent, or Firm* — Goodhue, Coleman & Owens, P.C.

(57) ABSTRACT

A wearable device includes a housing, a rechargeable battery disposed within the housing and a short range transceiver for near field communication disposed within the housing. The short range transceiver for near field communications comprises a core and a plurality of coil turns wrapped around the core to thereby form a coil. A charging circuit may electrically connected between the coil and the rechargeable battery and configured to charge the rechargeable battery using electromagnetic waves received by the coil.

19 Claims, 7 Drawing Sheets

(56) References Cited

U.S. PATENT DOCUMENTS

| | | |
|---|---|---|
| 3,934,100 A | 1/1976 | Harada |
| 3,983,336 A | 9/1976 | Malek et al. |
| 4,069,400 A | 1/1978 | Johanson et al. |
| 4,150,262 A | 4/1979 | Ono |
| 4,334,315 A | 6/1982 | Ono et al. |
| D266,271 S | 9/1982 | Johanson et al. |
| 4,375,016 A | 2/1983 | Harada |
| 4,588,867 A | 5/1986 | Konomi |
| 4,617,429 A | 10/1986 | Bellafiore |
| 4,654,883 A | 3/1987 | Iwata |
| 4,682,180 A | 7/1987 | Gans |
| 4,791,673 A | 12/1988 | Schreiber |
| 4,852,177 A | 7/1989 | Ambrose |
| 4,865,044 A | 9/1989 | Wallace et al. |
| 4,984,277 A | 1/1991 | Bisgaard et al. |
| 5,008,943 A | 4/1991 | Arndt et al. |
| 5,185,802 A | 2/1993 | Stanton |
| 5,191,602 A | 3/1993 | Regen et al. |
| 5,201,007 A | 4/1993 | Ward et al. |
| 5,201,008 A | 4/1993 | Arndt et al. |
| D340,286 S | 10/1993 | Seo |
| 5,280,524 A | 1/1994 | Norris |
| 5,295,193 A | 3/1994 | Ono |
| 5,298,692 A | 3/1994 | Ikeda et al. |
| 5,343,532 A | 8/1994 | Shugart |
| 5,347,584 A | 9/1994 | Narisawa |
| 5,363,444 A | 11/1994 | Norris |
| D367,113 S | 2/1996 | Weeks |
| 5,497,339 A | 3/1996 | Bernard |
| 5,606,621 A | 2/1997 | Reiter et al. |
| 5,613,222 A | 3/1997 | Guenther |
| 5,654,530 A | 8/1997 | Sauer et al. |
| 5,692,059 A | 11/1997 | Kruger |
| 5,721,783 A | 2/1998 | Anderson |
| 5,748,743 A | 5/1998 | Weeks |
| 5,749,072 A | 5/1998 | Mazurkiewicz et al. |
| 5,771,438 A | 6/1998 | Palermo et al. |
| D397,796 S | 9/1998 | Yabe et al. |
| 5,802,167 A | 9/1998 | Hong |
| D410,008 S | 5/1999 | Almqvist |
| 5,929,774 A | 7/1999 | Charlton |
| 5,933,506 A | 8/1999 | Aoki et al. |
| 5,949,896 A | 9/1999 | Nageno et al. |
| 5,987,146 A | 11/1999 | Pluvinage et al. |
| 6,021,207 A | 2/2000 | Puthuff et al. |
| 6,054,989 A | 4/2000 | Robertson et al. |
| 6,081,724 A | 6/2000 | Wilson |
| 6,084,526 A | 7/2000 | Blotky et al. |
| 6,094,492 A | 7/2000 | Boesen |
| 6,111,569 A | 8/2000 | Brusky et al. |
| 6,112,103 A | 8/2000 | Puthuff |
| 6,157,727 A | 12/2000 | Rueda |
| 6,167,039 A | 12/2000 | Karlsson et al. |
| 6,181,801 B1 | 1/2001 | Puthuff et al. |
| 6,208,372 B1 | 3/2001 | Barraclough |
| 6,230,029 B1 | 5/2001 | Yegiazaryan et al. |
| 6,275,789 B1 | 8/2001 | Moser et al. |
| 6,339,754 B1 | 1/2002 | Flanagan et al. |
| D455,835 S | 4/2002 | Anderson et al. |
| 6,408,081 B1 | 6/2002 | Boesen |
| 6,424,820 B1 | 7/2002 | Burdick et al. |
| D464,039 S | 10/2002 | Boesen |
| 6,470,893 B1 | 10/2002 | Boesen |
| D468,299 S | 1/2003 | Boesen |
| D468,300 S | 1/2003 | Boesen |
| 6,542,721 B2 | 4/2003 | Boesen |
| 6,560,468 B1 | 5/2003 | Boesen |
| 6,654,721 B2 | 11/2003 | Handelman |
| 6,664,713 B2 | 12/2003 | Boesen |
| 6,690,807 B1 | 2/2004 | Meyer |
| 6,694,180 B1 | 2/2004 | Boesen |
| 6,718,043 B1 | 4/2004 | Boesen |
| 6,738,485 B1 | 5/2004 | Boesen |
| 6,748,095 B1 | 6/2004 | Goss |
| 6,754,358 B1 | 6/2004 | Boesen et al. |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2 | 7/2005 | Boesen |
| 6,952,483 B2 | 10/2005 | Boesen et al. |
| 6,987,986 B2 | 1/2006 | Boesen |
| 7,010,137 B1 | 3/2006 | Leedom et al. |
| 7,113,611 B2 | 9/2006 | Leedom et al. |
| D532,520 S | 11/2006 | Kampmeier et al. |
| 7,136,282 B1 | 11/2006 | Rebeske |
| 7,203,331 B2 | 4/2007 | Boesen |
| 7,209,569 B2 | 4/2007 | Boesen |
| 7,215,790 B2 | 5/2007 | Boesen et al. |
| D549,222 S | 8/2007 | Huang |
| D554,756 S | 11/2007 | Sjursen et al. |
| 7,403,629 B1 | 7/2008 | Aceti et al. |
| D579,006 S | 10/2008 | Kim et al. |
| 7,463,902 B2 | 12/2008 | Boesen |
| 7,508,411 B2 | 3/2009 | Boesen |
| D601,134 S | 9/2009 | Elabidi et al. |
| 7,825,626 B2 | 11/2010 | Kozisek |
| 7,965,855 B1 | 6/2011 | Ham |
| 7,979,035 B2 | 7/2011 | Griffin et al. |
| 7,983,628 B2 | 7/2011 | Boesen |
| D647,491 S | 10/2011 | Chen et al. |
| 8,095,188 B2 | 1/2012 | Shi |
| 8,108,143 B1 | 1/2012 | Tester |
| 8,140,357 B1 | 3/2012 | Boesen |
| D666,581 S | 9/2012 | Perez |
| 8,300,864 B2 | 10/2012 | Müllenborn et al. |
| 8,406,448 B2 | 3/2013 | Lin |
| 8,436,780 B2 | 5/2013 | Schantz et al. |
| D687,021 S | 7/2013 | Yuen |
| 8,719,877 B2 | 5/2014 | VonDoenhoff et al. |
| 8,774,434 B2 | 7/2014 | Zhao et al. |
| 8,831,266 B1 | 9/2014 | Huang |
| 8,891,800 B1 | 11/2014 | Shaffer |
| 8,994,498 B2 | 3/2015 | Agrafioti et al. |
| D728,107 S | 4/2015 | Martin et al. |
| 9,013,145 B2 | 4/2015 | Castillo et al. |
| 9,037,125 B1 | 5/2015 | Kadous |
| D733,103 S | 6/2015 | Jeong et al. |
| 9,081,944 B2 | 7/2015 | Camacho et al. |
| 9,510,159 B1 | 11/2016 | Cuddihy et al. |
| D773,439 S | 12/2016 | Walker |
| D775,158 S | 12/2016 | Dong et al. |
| D777,710 S | 1/2017 | Palmborg et al. |
| D788,079 S | 5/2017 | Son et al. |
| 2001/0005197 A1 | 6/2001 | Mishra et al. |
| 2001/0027121 A1 | 10/2001 | Boesen |
| 2001/0043707 A1 | 11/2001 | Leedom |
| 2001/0056350 A1 | 12/2001 | Calderone et al. |
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0002705 A1 | 1/2003 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0160511 A1 | 8/2004 | Boesen |
| 2005/0017842 A1 | 1/2005 | Dematteo |
| 2005/0043056 A1 | 2/2005 | Boesen |
| 2005/0094839 A1 | 5/2005 | Gwee |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0251455 A1 | 11/2005 | Boesen |

(56) References Cited

U.S. PATENT DOCUMENTS

| | | |
|---|---|---|
| 2005/0266876 A1 | 12/2005 | Boesen |
| 2006/0029246 A1 | 2/2006 | Boesen |
| 2006/0074671 A1 | 4/2006 | Farmaner et al. |
| 2006/0074808 A1 | 4/2006 | Boesen |
| 2006/0166715 A1 | 7/2006 | Engelen et al. |
| 2006/0166716 A1 | 7/2006 | Seshadri et al. |
| 2006/0220915 A1 | 10/2006 | Bauer |
| 2006/0258412 A1 | 11/2006 | Liu |
| 2008/0076972 A1 | 3/2008 | Dorogusker et al. |
| 2008/0090622 A1 | 4/2008 | Kim et al. |
| 2008/0146890 A1 | 6/2008 | LeBoeuf et al. |
| 2008/0254780 A1 | 10/2008 | Kuhl et al. |
| 2008/0255430 A1 | 10/2008 | Alexandersson et al. |
| 2008/0260169 A1* | 10/2008 | Reuss ................ H04R 1/10 381/58 |
| 2008/0297349 A1* | 12/2008 | Leone ............ G08B 13/2411 340/572.1 |
| 2009/0003620 A1 | 1/2009 | McKillop et al. |
| 2009/0008275 A1 | 1/2009 | Ferrari et al. |
| 2009/0017881 A1 | 1/2009 | Madrigal |
| 2009/0073070 A1 | 3/2009 | Rofougaran |
| 2009/0097689 A1 | 4/2009 | Prest et al. |
| 2009/0105548 A1 | 4/2009 | Bart |
| 2009/0191920 A1 | 7/2009 | Regen et al. |
| 2009/0245559 A1 | 10/2009 | Boltyenkov et al. |
| 2009/0261114 A1 | 10/2009 | McGuire et al. |
| 2009/0296968 A1 | 12/2009 | Wu et al. |
| 2010/0033313 A1 | 2/2010 | Keady et al. |
| 2010/0203831 A1 | 8/2010 | Muth |
| 2010/0210212 A1 | 8/2010 | Sato |
| 2010/0320961 A1 | 12/2010 | Castillo et al. |
| 2011/0115429 A1* | 5/2011 | Toivola .............. H01F 38/14 320/108 |
| 2011/0140844 A1 | 6/2011 | McGuire et al. |
| 2011/0239497 A1 | 10/2011 | McGuire et al. |
| 2011/0286615 A1 | 11/2011 | Olodort et al. |
| 2012/0057740 A1 | 3/2012 | Rosal |
| 2013/0316642 A1 | 11/2013 | Newham |
| 2013/0346168 A1 | 12/2013 | Zhou et al. |
| 2014/0079257 A1 | 3/2014 | Ruwe et al. |
| 2014/0106677 A1 | 4/2014 | Altman |
| 2014/0122116 A1 | 5/2014 | Smythe |
| 2014/0163771 A1 | 6/2014 | Demeniuk |
| 2014/0185828 A1 | 7/2014 | Helbling |
| 2014/0222462 A1 | 8/2014 | Shakil et al. |
| 2014/0235169 A1 | 8/2014 | Parkinson et al. |
| 2014/0270227 A1 | 9/2014 | Swanson |
| 2014/0270271 A1 | 9/2014 | Dehe et al. |
| 2014/0348367 A1 | 11/2014 | Vavrus et al. |
| 2015/0028996 A1 | 1/2015 | Agrafioti et al. |
| 2015/0110587 A1 | 4/2015 | Hori |
| 2015/0148989 A1 | 5/2015 | Cooper et al. |
| 2015/0245127 A1 | 8/2015 | Shaffer |
| 2016/0033280 A1 | 2/2016 | Moore et al. |
| 2016/0072558 A1 | 3/2016 | Hirsch et al. |
| 2016/0073189 A1 | 3/2016 | Lindén et al. |
| 2016/0125892 A1 | 5/2016 | Bowen et al. |
| 2016/0360350 A1 | 12/2016 | Watson et al. |
| 2017/0064437 A1 | 3/2017 | Hviid et al. |
| 2017/0078780 A1 | 3/2017 | Qian et al. |
| 2017/0111726 A1 | 4/2017 | Martin et al. |
| 2017/0155992 A1 | 6/2017 | Perianu et al. |

FOREIGN PATENT DOCUMENTS

| | | |
|---|---|---|
| CN | 104837094 A | 8/2015 |
| EP | 1469659 A1 | 10/2004 |
| EP | 1017252 A3 | 5/2006 |
| EP | 2903186 A1 | 8/2015 |
| GB | 2074817 | 4/1981 |
| GB | 2508226 A | 5/2014 |
| WO | 2008103925 A1 | 8/2008 |
| WO | 2007034371 A3 | 11/2008 |
| WO | 2011001433 A2 | 1/2011 |
| WO | 2012071127 A1 | 5/2012 |
| WO | 2013134956 A1 | 9/2013 |
| WO | 2014046602 A1 | 3/2014 |
| WO | 2014043179 A3 | 7/2014 |
| WO | 2015061633 A2 | 4/2015 |
| WO | 2015110577 A1 | 7/2015 |
| WO | 2015110587 A1 | 7/2015 |
| WO | 2016032990 A1 | 3/2016 |

OTHER PUBLICATIONS

Announcing the $3,333,333 Stretch Goal (Feb. 24, 2014).
Ben Coxworth: "Graphene-based ink could enable low-cost, foldable electronics", "Journal of Physical Chemistry Letters", Northwestern University, (May 22, 2013).
Blain: "World's first graphene speaker already superior to Sennheiser MX400", htt://www.gizmag.com/graphene-speaker-beats-sennheiser-mx400/31660, (Apr. 15, 2014).
BMW, "BMW introduces BMW Connected—The personalized digital assistant", "http://bmwblog.com/2016/01/05/bmw-introduces-bmw-connected-the-personalized-digital-assistant", (Jan. 5, 2016).
BRAGI is on Facebook (2014).
BRAGI Update—Arrival of Prototype Chassis Parts—More People—Awesomeness (May 13, 2014).
BRAGI Update—Chinese New Year, Design Verification, Charging Case, More People, Timeline(Mar. 6, 2015).
BRAGI Update—First Sleeves From Prototype Tool—Software Development Kit (Jun. 5, 2014).
BRAGI Update—Let's Get Ready to Rumble, a Lot to Be Done Over Christmas (Dec. 22, 2014).
BRAGI Update—Memories From April—Update on Progress (Sep. 16, 2014).
BRAGI Update—Memories from May—Update on Progress—Sweet (Oct. 13, 2014).
BRAGI Update—Memories From One Month Before Kickstarter—Update on Progress (Jul. 10, 2014).
BRAGI Update—Memories From the First Month of Kickstarter—Update on Progress (Aug. 1, 2014).
BRAGI Update—Memories From the Second Month of Kickstarter—Update on Progress (Aug. 22, 2014).
BRAGI Update—New People @BRAGI—Prototypes (Jun. 26, 2014).
BRAGI Update—Office Tour, Tour to China, Tour to CES (Dec. 11, 2014).
BRAGI Update—Status on Wireless, Bits and Pieces, Testing—Oh Yeah, Timeline(Apr. 24, 2015).
BRAGI Update—The App Preview, The Charger, The SDK, BRAGI Funding and Chinese New Year (Feb. 11, 2015).
BRAGI Update—What We Did Over Christmas, Las Vegas & CES (Jan. 19, 2014).
BRAGI Update—Years of Development, Moments of Utter Joy and Finishing What We Started(Jun. 5, 2015).
BRAGI Update—Alpha 5 and Back to China, Backer Day, on Track(May 16, 2015).
BRAGI Update—Beta2 Production and Factory Line(Aug. 20, 2015).
BRAGI Update—Certifications, Production, Ramping Up.
BRAGI Update—Developer Units Shipping and Status(Oct. 05, 2015).
BRAGI Update—Developer Units Started Shipping and Status (Oct. 19, 2015).
BRAGI Update—Developer Units, Investment, Story and Status(Nov. 2, 2015).
BRAGI Update—Getting Close(Aug. 6, 2015).
BRAGI Update—On Track, Design Verification, How It Works and What's Next(Jul. 15, 2015).
BRAGI Update—On Track, on Track and Gems Overview.
BRAGI Update—Status on Wireless, Supply, Timeline and Open House@BRAGI(Apr. 1, 2015).
BRAGI Update—Unpacking Video, Reviews on Audio Perform and Boy Are We Getting Close(Sep. 10, 2015).
Healthcare Risk Management Review, "Nuance updates computer-assisted physician documentation solution" (Oct. 20, 2016).

(56) References Cited

OTHER PUBLICATIONS

Hoyt et. al., "Lessons Learned from Implementation of Voice Recognition for Documentation in the Military Electronic Health Record System", The American Health Information Management Association (2017).
Hyundai Motor America, "Hyundai Motor Company Introduces a Health + Mobility Concept for Wellness in Mobility", Fountain Valley, Californa (2017).
International Search Report & Written Opinion, PCT/EP2016/070231 (dated Nov. 18, 2016).
Last Push Before the Kickstarter Campaign Ends on Monday 4pm CET (Mar. 28, 2014).
Nigel Whitfield: "Fake tape detectors, 'from the stands' footie and UGH? Internet of Things in my set-top box"; http://www.theregister.co.uk/2014/09/24/ibc_round_up_object_audio_dlna_iot/ (Sep. 24, 2014).
Staab, Wayne J., et al., "A One-Size Disposable Hearing Aid is Introduced", The Hearing Journal 53(4):36-41) Apr. 2000.
Stretchgoal—Its Your Dash (Feb. 14, 2014).
Stretchgoal—The Carrying Case for the Dash (Feb. 12, 2014).
Stretchgoal—Windows Phone Support (Feb. 17, 2014).
The Dash + The Charging Case & The BRAGI News (Feb. 21, 2014).
The Dash—A Word From Our Software, Mechanical and Acoustics Team + An Update (Mar. 11, 2014).
Update From BRAGI—$3,000,000—Yipee (Mar. 22, 2014).
Wikipedia, "Gamebook", https://en.wikipedia.org/wiki/Gamebook, Sep. 3, 2017, 5 pages.
Wikipedia, "Kinect", "https://en.wikipedia.org/wiki/Kinect", 18 pages, (Sep. 9, 2017).
Wikipedia, "Wii Balance Board", "https://en.wikipedia.org/wiki/Wii_Balance_Board", 3 pages, (Jul. 20, 2017).

\* cited by examiner

EARPIECE WITH WIRELESSLY RECHARGING BATTERY

PRIORITY STATEMENT

The present application claims priority to U.S. Provisional Application No. 62/360,378, filed Jul. 9, 2016, hereby incorporated by reference in its entirety.

FIELD OF THE INVENTION

The present invention relates to wireless earpieces. More particularly, but not exclusively, the present invention relates to wirelessly recharging earpieces.

BACKGROUND OF THE ART

The earpiece may one day become one of the most widely used and powerful wearable devices available. However, one of the problems with earpieces relates to battery consumption and use. Where the earpiece provides complicated processing or audio processing, has multiple sensors, and multiple transceivers, and produces audio output, battery consumption becomes an issue. Therefore, any onboard batteries would need to be either replaced or recharged, with recharging being preferred.

However, where batteries are to recharged, additional constraints on the design of the earpiece may be imposed such as the inclusion of a connector for recharging that is sufficiently durable and easy to use. Such a connector may take space that could otherwise be used to improve functionality of the earpiece. In addition, earpieces which are sized and shaped to fit within the external auditory canals of users may have relatively awkward and inconvenient shapes. Thus, not only does a connector on the earpiece take space, but the earpiece will also have to mate with another connector of a power source. It may be burdensome or inconvenient for a user to charge one or more earpieces in this manner.

Another issue is that if the earpiece is intended to be waterproof or water resistant, this may further constrain the design of the earpiece where connectors are used for recharging batteries.

What is needed are earpieces are related methods which allow for wireless recharging of the batteries contained therein.

SUMMARY OF THE INVENTION

Therefore it is a primary object, feature, or advantage of the present invention to improve over the state of the art.

It is a further object, feature, or advantage of the present invention to provide for an improved wearable device.

It is a still further object, feature, or advantage of the present invention to provide a wireless earpiece which is configured to permit wireless recharging.

Another object, feature, or advantage of the present invention is to provide a wireless earpiece which includes a coil which may be used for multiple purposes including both communications and re-charging.

Yet another object, feature, or advantage of the present invention is to provide a wireless earpiece which is easy and convenient for users to use and recharge.

One of these and/or other objects, features, or advantages of the present invention will become apparent from the specification and claims that follow. It is to be understood that different embodiments are disclosed herein and that no embodiment need meet each and every object, feature, or advantage as set forth herein. Different embodiments may have different objects, features, or advantages.

According to one aspect a wearable device includes a housing, a rechargeable battery disposed within the housing, and a short range transceiver for near field communication disposed within the housing. The short range transceiver for near field communications may include a core and a plurality of coil turns wrapped around the core to thereby form a coil. The wearable device may also include a charging circuit electrically connected between the coil and the rechargeable battery and configured to charge the rechargeable battery using electromagnetic waves received by the coil. The wearable device may be an earpiece. The wearable device may include a switch operatively connected to the charging circuit to selectively control operation of the charging circuit. The short range transceiver may be a near field magnetic induction (NFMI) transceiver. The wearable device may be configured to determine if the wearable device is positioned within an ear of a user and may be configured to determine if the wearable device is positioned on a charging surface.

According to another aspect, a system includes a first wearable device comprises a housing, a short range transceiver for near field communication disposed within the housing, wherein the short range transceiver for near field communications comprises a core and a plurality of coil turns wrapped around the core to thereby form a coil, and a charging circuit electrically connected between the coil and the rechargeable battery and configured to charge the rechargeable battery using electromagnetic waves received by the coil. The system also includes a charging surface comprising a plurality of source coils for operative communication with the coil of the first wearable device to transfer electromagnetic energy to the first wearable device to recharge the rechargeable battery of the first wearable device. The system may further include a second wearable device comprising a housing, a short range transceiver for near field communication disposed within the housing, wherein the short range transceiver for near field communications comprises a core and a plurality of coil turns wrapped around the core to thereby form a coil, and a charging circuit electrically connected between the coil and the rechargeable battery and configured to charge the rechargeable battery using electromagnetic waves received by the coil. The first and second wearable devices may be earpieces.

According to another aspect, a method of charging a wearable device may be provided. The method may include receiving communications using a coil when the wearable device is in a first mode of operation and charging a rechargeable battery of the wearable device when the wearable device is in a second mode of operation. The wearable device may include a housing, a rechargeable battery disposed within the housing, a short range transceiver for near field communication disposed within the housing, wherein the short range transceiver for near field communications comprises a core and a plurality of coil turns wrapped around the core to thereby form the coil, and a charging circuit electrically connected between the coil and the rechargeable battery and configured to charge the rechargeable battery using electromagnetic waves received by the coil. The method may include switching to the first mode of operation if the wearable device detects it is positioned within an ear of a user. The method may include switching to the second mode of operation if the wearable device detects it is not positioned within the ear of the user and is positioned at one or more charging coils. The one or more charging coils may be associated with a charging surface.

DETAILED DESCRIPTION

The present invention relates to a wearable device such as an earpiece which uses a coil for both communications and recharging of a battery. Although generally described herein with respect to a near field magnetic induction (NFMI) antenna for use in an ear piece within a set of ear pieces, it is to be understood that the present invention is not limited to that specific application and may be used as an antenna for induction in other types of devices including other types of wearable devices.

Figure 1:
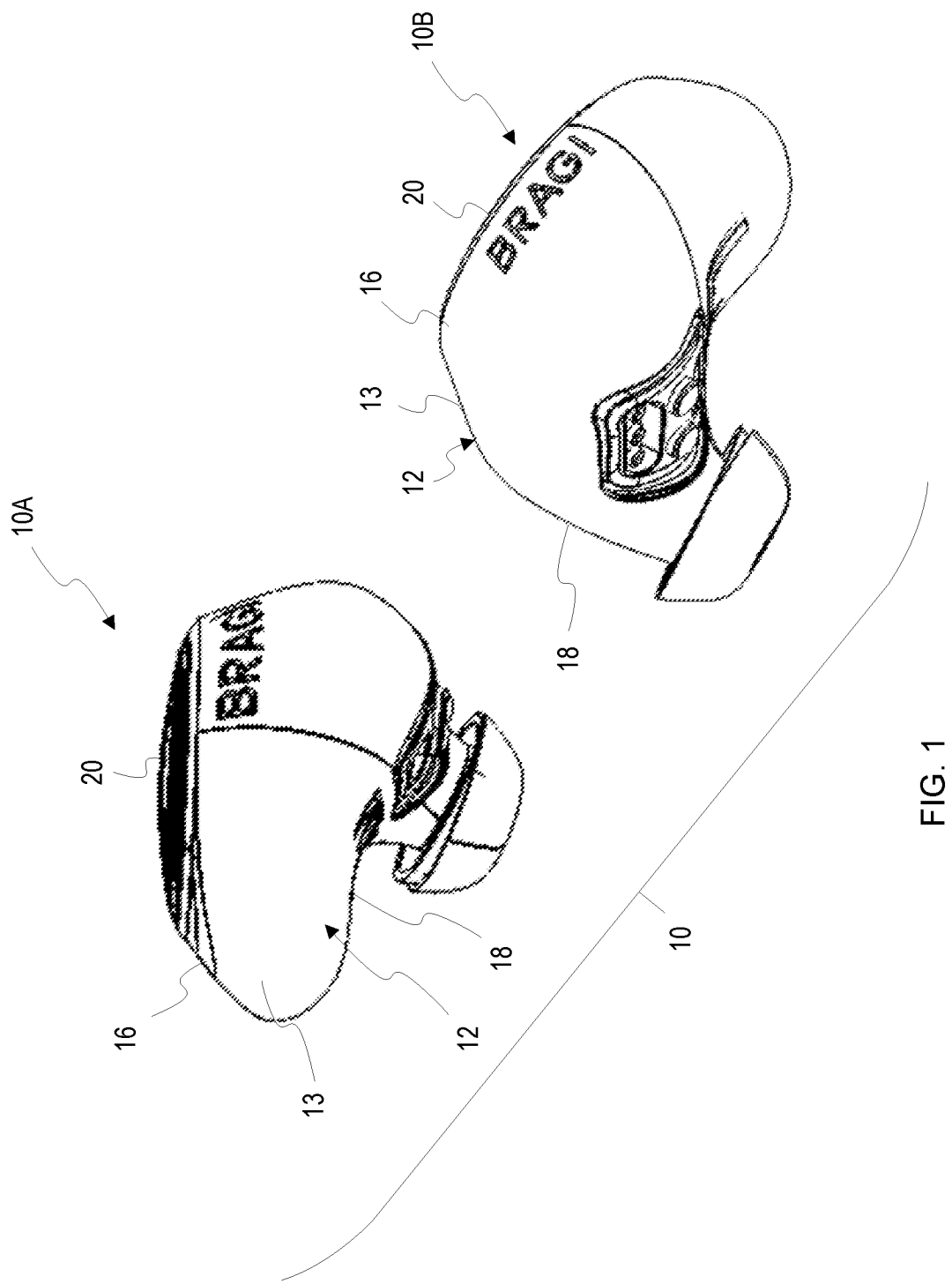
FIG. 1 illustrates one example of a system including two wearable devices in the form of left and right ear pieces which bi-directionally communicate with each other.
Figure 2:
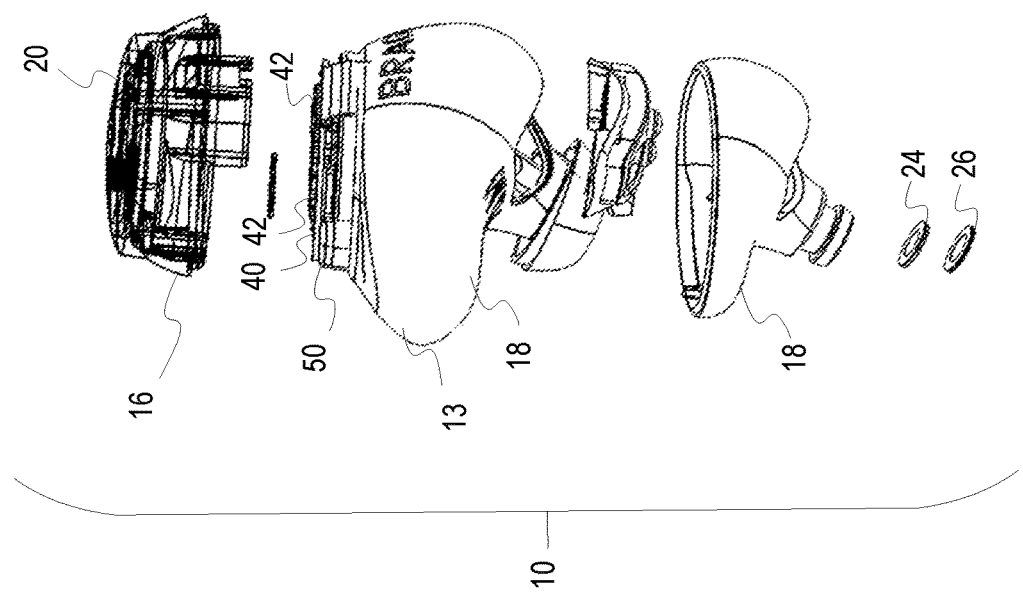
FIG. 2 is an exploded view of a wearable device.

FIG. 1 illustrates one example of a system 10 which includes a first wearable device 10A in the form of an ear piece and a second wearable device 10B also in the form of an ear piece, each having an ear piece housing 12 with a central portion 13 with an upper portion 16 and a lower portion 18. A light guide assembly 20 is shown operatively connected to the housing to provide for selective illumination to provide feedback to a user. FIG. 2 provides an exploded view of the wearable device 10A. A waterproof pad 24 and protection mesh 26 are shown. In addition in the central or main portion 13 of the wearable device 10A a printed circuit board 40 is shown with a plurality of electronic components 42 mounted thereto. The plurality of electronic components 42 may include a short range transceiver configured for far field communications such as a wireless radio such as a Bluetooth transceiver, a Wi-Fi transceiver, an ultra-wideband (UWB), or other type of transceiver. A core 50 is mounted at an edge or perimeter of the printed circuit board 40. The core 50 is preferably mounted at a posterosuperior portion of the wearable device 10A.

The system 10 allows for near field communication of audio channels between the left and right-sided wearable devices 10A, 10B. Other types of data may also be communicated between the left and right-sided wearable devices 10A, 10B if desired including sensor information or other data.

Figure 3:
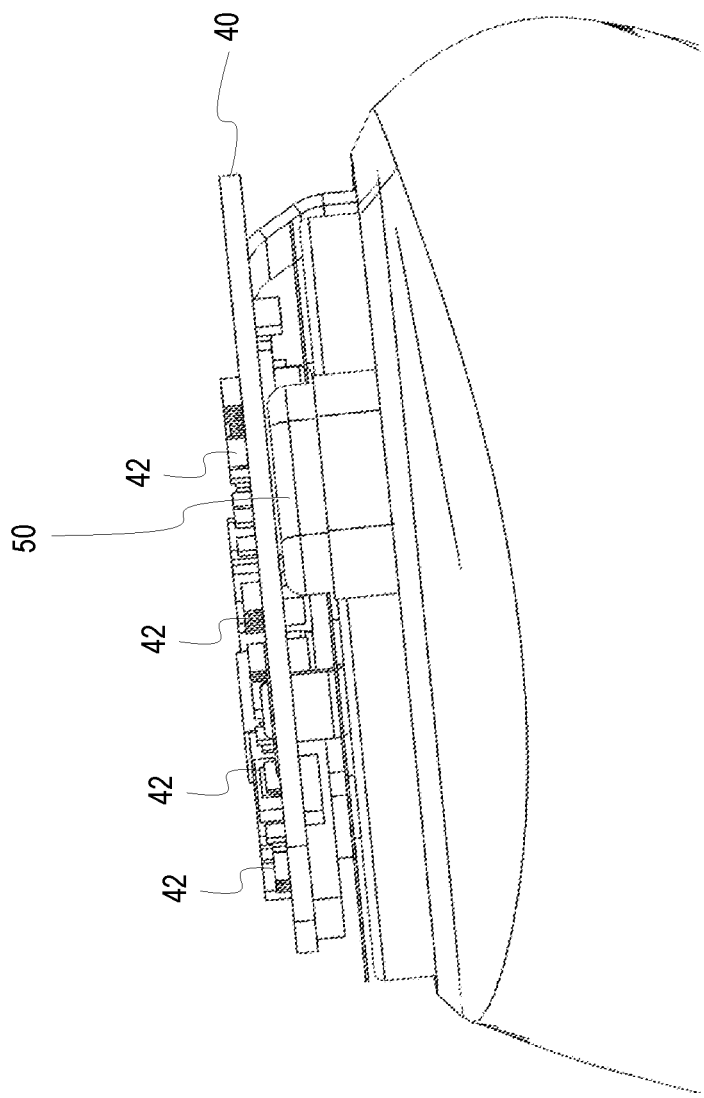
FIG. 3 illustrates a printed circuit board of the wearable device positioned relative to an induction circuit/antenna.
Figure 4:
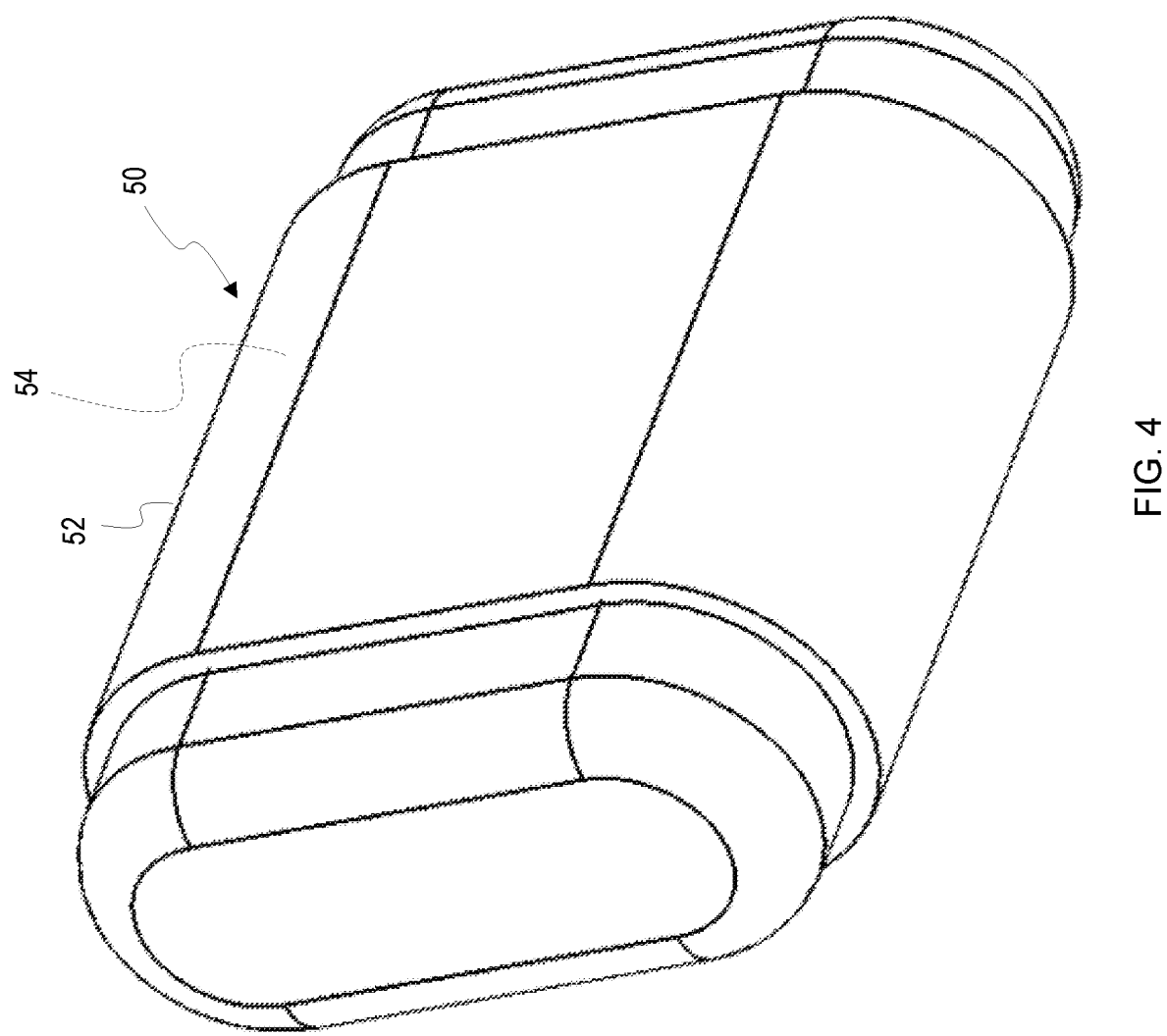
FIG. 4 illustrates a core.
Figure 5:
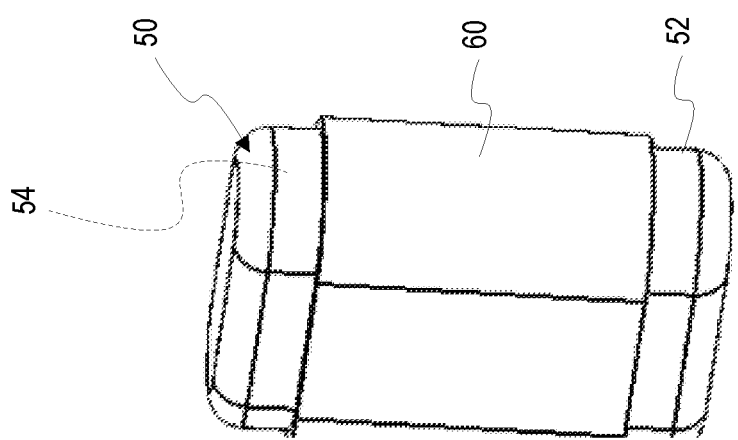
FIG. 5 illustrates a core with coil turns thereon.

FIG. 3 illustrates another view of the printed circuit board 40 with electronic components 42. A core 50 is shown mounted at an edge or perimeter of the printed circuit board 40. The printed circuit board is generally planar. Note that the core 50 is mounted perpendicularly or orthogonally to the top surface of the printed circuit board 40 and the plurality of components 42 mounted thereto. Positioning the core 50 in this relationship provides for reducing electromagnetic interference. The core 50 may be formed of a ferrite material. For example, the core 50 may be a ferrite sheet magnetic spacer. As shown in FIG. 4, where the core 50 is a ferrite sheet magnetic spacer 52, the core 50 may be positioned over or wrapped around a battery 54. As shown in FIG. 5, a plurality of coil turns 60 may be wrapped around the core 50.

In one embodiment NFMI may be used for the communication and audio channels between the left and right sided wearable devices. Placement of the coil at the perimeter of the wearable improves the electromagnetic field, avoiding degradation from adjacent onboard electronics. This allowed for optimal placement of the magnetic field for transmission and reception between the left and right wearable. The preferred embodiment allows for precise positioning within the device for optimal orientation for the electromagnetic field. Further, the preferred embodiment also allows for an NFMI antenna that is sufficiently powerful for the expected tasks, is straightforward in its manufacturing and assembly.

Figure 6:
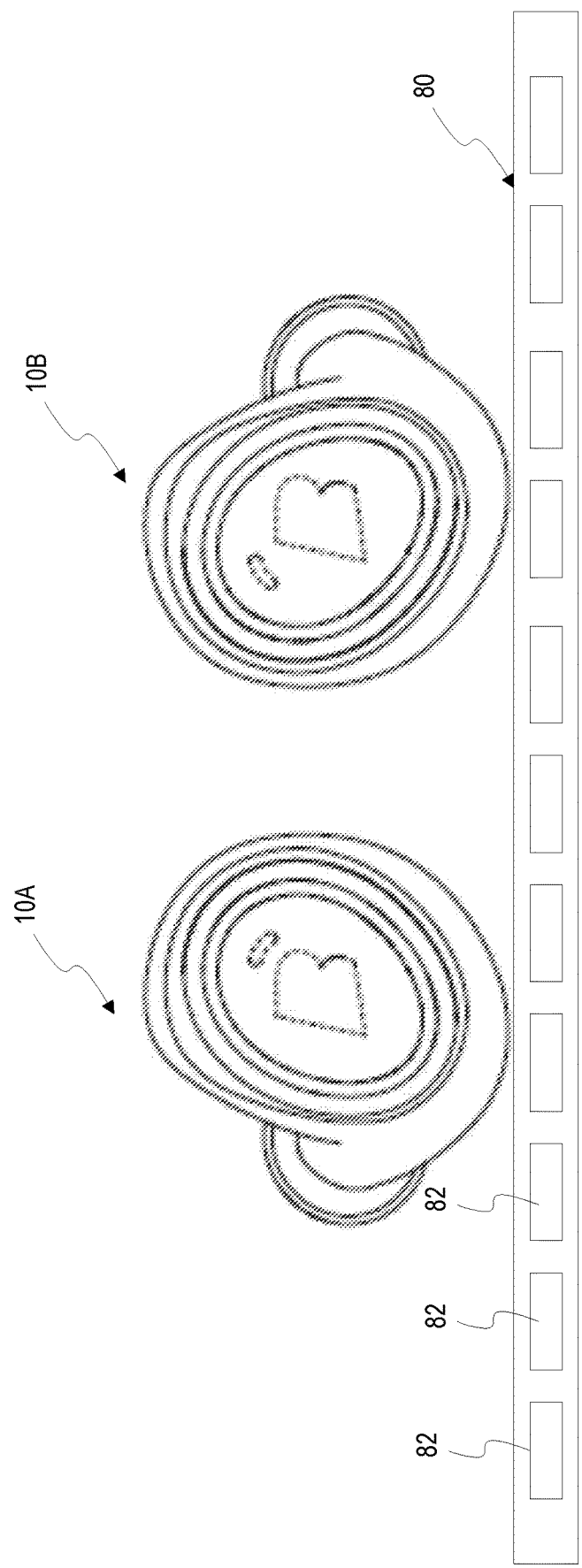
FIG. 6 illustrates a set of earpiece wearable devices at or on a charging surface.

FIG. 6 illustrates a system which includes a left earpiece 10A and a right ear piece 10B. The earpieces are positioned on or at a charging surface 80. The charging surface 80 may include one or more source coils 82. The source coils 82 may be powered in any number of ways. The source coils 82 are in operative communication with the coils of the earpieces 10A, 10B in order to transfer electromagnetic energy from the source coils to the coils of the earpieces 10A, 10B in order to recharge batteries disposed within the earpieces. Instead of a flat charging surface, earpieces may be positioned within a case of any number of styles or shapes which allow for the source coils 82 to be sufficiently close to the coils of the earpieces 10A.

Figure 7:
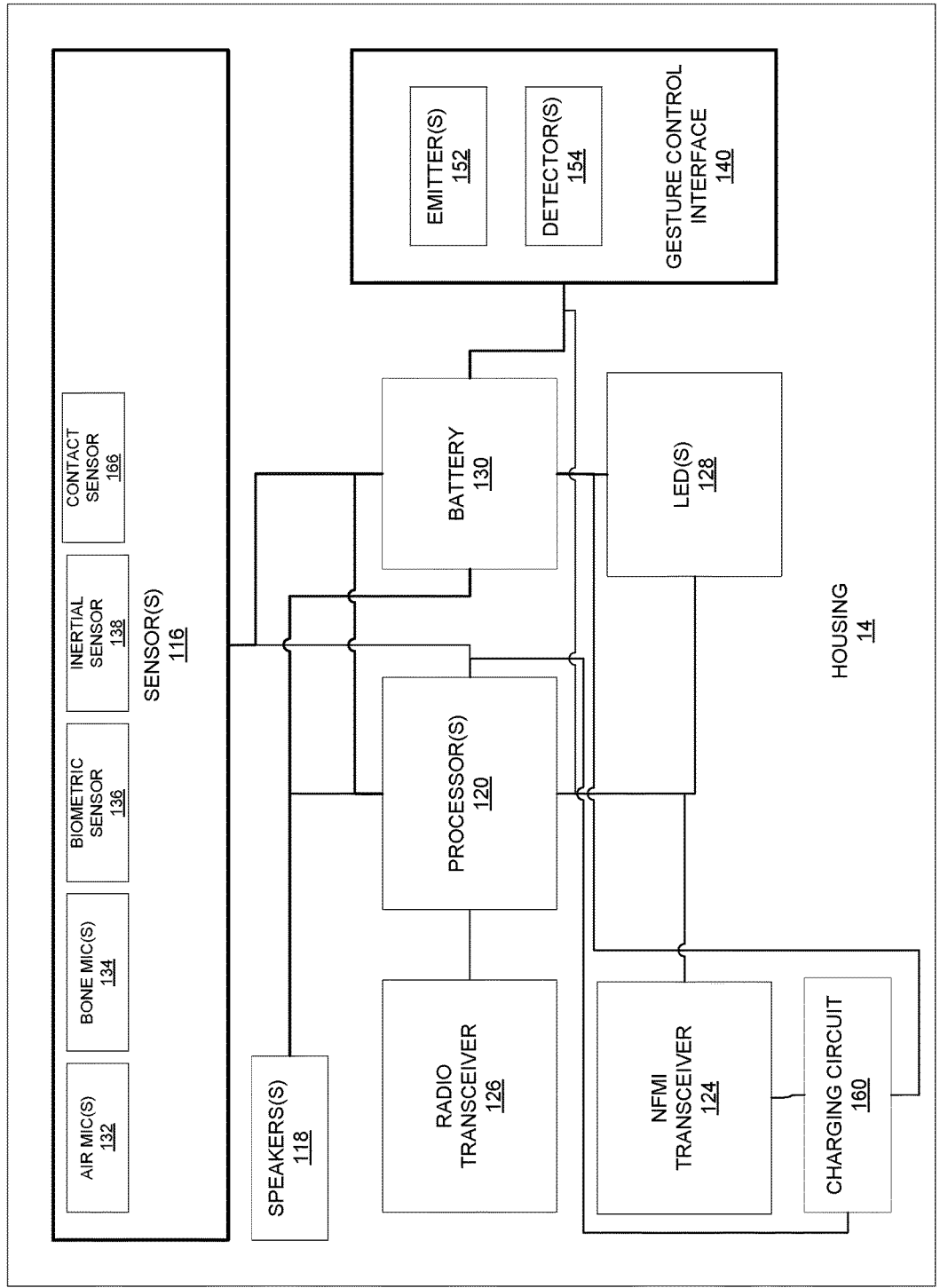
FIG. 7 illustrates one example of a block diagram of an earpiece.

FIG. 7 is a block diagram illustrating one example of an earpiece 12. One or more sensors 116 are present within the earpiece 12. The one or more sensors may include an air microphone 132, a bone microphone 134, a biometric sensor 136 such as a pulse oximeter, temperature sensor or other type of sensor, an inertial sensor 138, and a contact sensor 166. Although representative examples of sensors are shown and described it is to be understood that there may be multiple sensors of the same type and any number of additional types of sensors may be present within the earpiece. One or more speakers 118 may also be present. One or more processors 120 are shown. The various sensors 116, speakers 118, radio transceiver 126, NFMI transceiver 124, LEDs 128, may be operatively connected to the one or more processors. A gesture control interface 140 may also be present which may include one or more emitters 152 and detectors 154 which are also operatively connected to one or more processors 120. A battery 130 may also be present. A charging circuit 160 may also be operatively connected to one or more processors 120 and the battery 130. The charging circuit 160 may be operatively connected to the same coil which forms a part of the NFMI transceiver 124.

The earpiece may be configured to determine if the earpiece is positioned within an ear of a user or otherwise in use by a user of if the earpiece is positioned on a recharging surface. These determinations may be made in various ways. For example, to determine if the earpiece includes a physiological sensor or biometric sensor 136 such as a pulse oximeter then if there is pulse reading the earpiece may be considered to be within the ear of the user. In addition, or alternatively, if the earpiece includes an accelerometer or other inertial sensor 138 the position of the earpiece may be used to determine if the ear piece is within the ear of the user. One or more contact sensors 166 may be used to determine if the earpiece is positioned within the earpiece. Sounds may be emitted from a speaker 118 within the external auditory canal of a user and sensed with a microphone 132 at the external auditory canal of a user, including sub-auditory sounds to determine if the earpiece is within the external auditory canal of the user. Any number of other sensors and methodologies may be used to determine if the earpiece is within the external auditory canal of a user. Any number of other methods may be used including asking the user.

The earpiece may also be configured to determine if it positioned on the recharging surface. For example, if it is determined that the earpiece is not within the ear and voltage levels associated with the coil correlate with known levels associated with the earpiece being positioned on the recharging surface then it may be determined that the earpiece is on the recharging surface. Once it is known that the earpiece is not within the ear and that the earpiece is positioned on the recharging surface then a switch may be activated to allow the charging circuit to harvest the electromagnetic energy from the coil in order to recharge the battery.

Therefore, a wearable device has been shown and described and a system including multiple ear pieces which communicate with one another and also allow for recharging of batteries using the same coils. It is to be understood that the present invention contemplates numerous variations, options, and alternatives. The present invention is not to be limited to the specific embodiments and examples set forth herein.

What is claimed is:

1. A wearable device, comprising:
   a housing;
   a rechargeable battery disposed within the housing;
   a short-range transceiver for near field communication disposed within the housing and configured to send and receive audio;
   wherein the short-range transceiver for near field communications comprises a core and a plurality of coil turns wrapped around the core to thereby form a coil;
   a charging circuit electrically connected between the coil and the rechargeable battery and configured to charge the rechargeable battery using electromagnetic waves received by the coil.

2. The wearable device of claim 1 wherein the wearable device is an earpiece.

3. The wearable device of claim 2 wherein the core is mounted at a posterosuperior portion of the wearable device.

4. The wearable device of claim 1 wherein the core comprises ferrite.

5. The wearable device of claim 1 wherein the core comprises a ferrite sheet magnetic shield spacer wrapped around the rechargeable battery.

6. The wearable device of claim 1 further comprising a switch operatively connected to the charging circuit to selectively control operation of the charging circuit.

7. The wearable device of claim 1 wherein the short-range transceiver is a near field magnetic induction (NFMI) transceiver.

8. The wearable device of claim 1 wherein the wearable device is configured to determine if the wearable device is positioned within an ear of a user.

9. The wearable device of claim 1 wherein the wearable device is configured to determine if the wearable device is positioned on a charging surface.

10. The wearable device of claim 9 further comprising a switch operatively connected to the charging circuit to selectively control operation of the charging circuit and wherein the wearable is configured to activate the charging circuit if the wearable device determines that the wearable device is not positioned within an ear of a user and further determines that the wearable device is positioned at a charging surface.

11. A system comprising:
    a first wearable device comprises a housing, a short range transceiver for near field communication and configured to send and receive audio disposed within the housing, wherein the short range transceiver for near field communications comprises a core and a plurality of coil turns wrapped around the core to thereby form a coil, and a charging circuit electrically connected between the coil and the rechargeable battery and configured to charge the rechargeable battery using electromagnetic waves received by the coil;
    a charging surface comprising a plurality of source coils for operative communication with the coil of the first wearable device to transfer electromagnetic energy to the first wearable device to recharge the rechargeable battery of the first wearable device.

12. The system of claim 11 further comprising a second wearable device comprising a housing, a short range transceiver for near field communication disposed within the housing, wherein the short range transceiver for near field communications comprises a core and a plurality of coil turns wrapped around the core to thereby form a coil, and a charging circuit electrically connected between the coil and the rechargeable battery and configured to charge the rechargeable battery using electromagnetic waves received by the coil.

13. The system of claim 11 wherein the first wearable device is an earpiece.

14. The system of claim 13 wherein the short-range transceiver is a near field magnetic induction transceiver.

15. The system of claim 11 wherein the core is mounted at a posterosuperior portion of the wearable device.

16. The system of claim 11 wherein the core comprises ferrite.

17. The system of claim 11 wherein the core comprises a ferrite sheet magnetic shield spacer wrapped around the rechargeable battery.

18. The system of claim 11 further comprising a switch operatively connected to the charging circuit to selectively control operation of the charging circuit.

19. A method of charging a wearable device, the method comprising:
    receiving audio communications using a coil when the wearable device is in a first mode of operation; and
    charging a rechargeable battery of the wearable device when the wearable device is in a second mode of operation;
    wherein the wearable device comprises a housing, a rechargeable battery disposed within the housing, a short range transceiver for near field communication disposed within the housing, wherein the short range transceiver for near field communications comprises a core and a plurality of coil turns wrapped around the core to thereby form the coil, and a charging circuit electrically connected between the coil and the rechargeable battery and configured to charge the rechargeable battery using electromagnetic waves received by the coil, and the method further comprising:
    switching to the first mode of operation if the wearable device detects it is positioned within an ear of a user;
    switching to the second mode of operation if the wearable device detects it is not positioned within the ear of the user and is positioned at one or more charging coils;

and wherein the one or more charging coils are associated with a charging surface.

\* \* \* \* \*